United States Patent
Van Geel et al.

(10) Patent No.: US 8,695,367 B2
(45) Date of Patent: Apr. 15, 2014

(54) HEAT INTEGRATION

(75) Inventors: Cees Van Geel, The Hague (NL); Elin Margit Kristina Josefsson, Amsterdam (NL); Gerrit Konijn, Amsterdam (NL); Hugo Gerardus Polderman, Amsterdam (NL); Arthur Willibrordus Titus Rots, Amsterdam (NL); Anton Pieter Westerink, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1502 days.

(21) Appl. No.: 11/627,248

(22) Filed: Jan. 25, 2007

(65) Prior Publication Data
US 2007/0169492 A1  Jul. 26, 2007

(30) Foreign Application Priority Data
Jan. 25, 2006  (EP) ..................................... 06250416

(51) Int. Cl.
*F25B 27/00*  (2006.01)
*F25B 15/00*  (2006.01)

(52) U.S. Cl.
USPC ........................................... 62/238.3; 62/107

(58) Field of Classification Search
USPC ............. 62/238.3, 107, 4, 236; 568/852, 866, 568/867
See application file for complete search history.

(56) References Cited

U.S. PATENT DOCUMENTS

| | | | | |
|---|---|---|---|---|
| 4,143,521 A | * | 3/1979 | Pano et al. | 62/101 |
| 4,530,826 A | * | 7/1985 | Ohashi et al. | 423/376 |
| 6,080,897 A | * | 6/2000 | Kawabe | 568/858 |
| 6,537,458 B1 | * | 3/2003 | Polderman | 210/801 |

FOREIGN PATENT DOCUMENTS

| | | | | |
|---|---|---|---|---|
| DE | 1031285 | 6/1958 | | |
| WO | WO9823351 | 6/1998 | ............ | B01D 17/00 |
| WO | WO0117935 | 3/2001 | ............ | C07C 39/151 |

* cited by examiner

*Primary Examiner* — Alexandra Elve
*Assistant Examiner* — Cassey D Bauer

(57) ABSTRACT

A heat integration system for removing heat of reaction from an EC-1 Reactor and generating Chilled liquid for use by one or more Consumer Units, in a catalytic process for producing EC from EO for conversion into MEG wherein the system comprises an EC-1 Reactor Cooler suitable for removing heat from an EC-1 Reactor, an Intermediate Loop which is in communication with the Reactor Cooler and with an absorption Refrigeration Unit, and which is suitable for conducting Intermediate liquid therebetween, the absorption Refrigeration Unit being suitable for generating Chilled liquid, and a Chilled liquid loop suitable for conducting Chilled liquid generated in the absorption Refrigeration Unit for use by one or more Consumer Units.

8 Claims, 10 Drawing Sheets

HEAT INTEGRATION

CROSS-REFERENCE TO RELATED APPLICATION

This application claims the benefit of European Patent Application No. 06250416.2, filed Jan. 25, 2006, which is incorporated herein by reference.

FIELD OF THE INVENTION

The present invention relates to: a system for heat integration in a process for producing ethylene carbonate (EC) from ethylene oxide (EO) for conversion into mono-ethylene glycol (MEG); a control system for use in the heat integration system; a two phase separator for use in the process and the heat integration system; their corresponding methods; and the uses of the system and separator in an EO/ethylene glycol (EG) unit.

BACKGROUND OF THE INVENTION

EG is produced by the reaction of EO, producing MEG as the main product. MEG is predominantly used for the manufacture of polyester fibres, polyethylene terephthalate (PET) and, to a lesser extent, in the cooling systems of motor vehicles where it serves as antifreeze.

EG is produced in a combined EO/EG process, which provides very efficient heat integration. The integrated process is usually split up into four sections: EO reaction and $CO_2$ removal plus EO recovery; light ends (LE) removal and EO purification; EC/MEG reaction and MEG recovery; and MEG purification.

In the EO reaction section EO is produced by reacting gaseous ethylene and oxygen on a catalyst at elevated temperature (200-300° C.) and pressure (15-20 bar). The reactions on the catalyst produce a considerable amount of heat, which is removed by generation of steam at the shell side of the reactor. The generated steam is used as heat medium in the plant.

In the EC/MEG reaction section, EO is reacted with $CO_2$ to EC. In one system the reaction is carried out in two reactors EC-1 and EC-2 that are lined up in series and in which the bulk of the EO is converted. Residual EO can, if required, be converted in a tubular reactor, the EC finishing reactor. The EC-1 reactor produces approximately 24 kcal/gmole (100 kJ/gmole) of reaction heat at a temperature of about 100° C. This heat must be removed from the reactor via a side draw and cooling and recycle to the reactor. This is discussed in U.S. Pat. No. 6,080,897.

In the system of U.S. Pat. No. 6,080,897 the heat generated in the EC section is low temperature heat which cannot be stepped up to useful energy, e.g. for steam production. We have now found that it is possible to integrate heat between the EC-1 reactor and other units elsewhere in the plant, whilst still achieving the desired EC-1 Reactor temperature via cooling in the liquid recycle and chilled liquid production.

SUMMARY OF THE INVENTION

Accordingly, in the broadest aspect of the invention there is provided a heat integration system for removing heat of reaction from an EC-1 Reactor and generating Chilled liquid for use by one or more Consumer Units, in a catalytic process for producing EC from EO for conversion into MEG wherein the system comprises an EC-1 Reactor Cooler suitable for removing heat from an EC-1 Reactor, an Intermediate Loop which is in communication with the EC-1 Reactor Cooler and with an absorption Refrigeration Unit, and which is suitable for conducting Intermediate liquid therebetween, the absorption Refrigeration Unit being suitable for generating Chilled liquid, and a Chilled liquid loop suitable for conducting Chilled liquid generated in the absorption Refrigeration Unit for use by one or more Consumer Units, the system being such that the absorption Refrigeration Unit uses heat generated in the EC-1 Reactor to generate Chilled liquid for the Chilled liquid loop and Consumer Unit(s), wherein the system additionally comprises a Shutdown Cooler having an independent cooling source which is suitable, alternatively or in addition to the absorption Refrigeration Unit, for removing heat from the EC-1 Reactor, and wherein the system additionally comprises an independent stand-by source of Chilled liquid which is suitable, alternatively or in addition to the absorption Refrigeration Unit, for generating chilled liquid, to serve the one or more Consumer Units.

The Intermediate Loop is suitably a closed loop. Preferably the Shutdown Cooler is in a bypass of the Intermediate Loop whereby Intermediate Liquid may be diverted to the bypass for heat removal by the Shutdown Cooler or may remain in the Intermediate Loop.

Preferably the Intermediate Loop includes a bypass of the absorption Refrigeration Unit whereby Intermediate cooling liquid may be conducted to the absorption Refrigeration Unit for heat removal or may bypass the absorption Refrigeration Unit.

Preferably the independent stand-by source of Chilled liquid comprises an independent stand-by absorption Refrigeration Unit. Reference herein to a stand-by source of Chilled liquid and to a stand-by absorption Refrigeration Unit is to an additional, independent source and Unit, that is available as a stand-by for operation when the absorption Refrigeration Unit is not (fully) in operation and that may be in permanent use or operation if desired.

The EC-1 Reactor Cooler may be internal or external to the EC-1 Reactor. Preferably the EC-1 Reactor Cooler is external. Preferably the EC-1 Reactor Cooler is located in an EC-1 Reactor liquid recycle which comprises a side draw and liquid recycle from the EC-1 Reactor. Preferably the recycle from the EC-1 reactor comprises from 50 to 99%, more preferably 80 to 95% of the total reactor feed flow. The recycle thereby provides for removal of heat of reaction and control of reactor temperature.

Preferably the system of the invention comprises a plurality of controllers, a plurality of control valves and one or more Control Units wherein the controllers provide signals relating to EC-1 Reactor loading and Consumer Unit(s) demand, to controllers or Control Units or a combination thereof, and/or to control valves regulating operation of the Shutdown Cooler and of the absorption Refrigeration Unit.

Preferably controllers are located: on the EC-1 Reactor; in the EC-1 Reactor liquid recycle, preferably downstream of the EC-1 Reactor Cooler between the EC-1 Reactor Cooler and the EC-1 Reactor; on the Intermediate Loop, preferably between the absorption Refrigeration Unit and the EC-1 Reactor Cooler upstream of the EC-1 Reactor Cooler; and/or on the Chilled liquid loop, preferably downstream of the absorption Refrigeration Unit and upstream of Consumer Unit(s). Control valves are located in the Shutdown Cooler bypass and in the Intermediate Loop in parallel to the Shutdown Cooler bypass, to regulate Intermediate Liquid flow to the Shutdown Cooler; and/or in the EC-1 Reactor liquid recycle upstream of the EC-1 reactor cooler; and/or in a bypass of the absorption Refrigeration Unit.

Preferably the controllers are each programmed to measure a value relating to planned loading and reactor conversion of the EC-1 Reactor, temperature or flow in the Intermediate Loop, flow in the EC-1 Reactor liquid recycle or temperature of the Chilled Liquid Loop, compare with a respective setpoint and to send an output signal to a controller, Control Unit and/or to a control valve to regulate loading of the Shutdown Cooler, flow in the Intermediate Loop bypass, flow in the EC-1 Reactor liquid recycle and/or operation of the absorption Refrigeration Unit.

Preferably a measured value relating to planned loading and EC-1 Reactor conversion is selected from temperature, conversion and flow rate, and is more preferably temperature. Preferably therefore controllers are temperature or flow controllers or a combination thereof, more preferably controllers for the EC-1 Reactor and Chilled Liquid Loop are temperature controllers and controllers for the Intermediate Loop are a combination of temperature and flow controllers.

The system of the invention provides an Intermediate Loop of Intermediate Liquid to remove heat from the EC-1 Reactor to drive the absorption Refrigeration Unit with return of Intermediate liquid to remove further heat from the EC-1 Reactor, and the Intermediate Loop is used in conjunction with a separate Shutdown Cooler in a bypass of the Intermediate Loop to remove EC-1 Reactor heat in case the absorption Refrigeration Unit cannot provide sufficient cooling to the Intermediate liquid to remove the full heat of EC-1 reaction. Accordingly the heat of the EC-1 Reactor may be used to produce Chilled liquid which may be used anywhere in Consumer Units in other Systems without compromising or endangering operation of the EC-1 Reactor or of Consumer Unit(s).

DESCRIPTION OF FIGURES

Embodiments of the invention are now illustrated in non limiting manner with respect to the following Examples and Figures wherein.

DETAILED DESCRIPTION OF THE INVENTION

Figure 1:
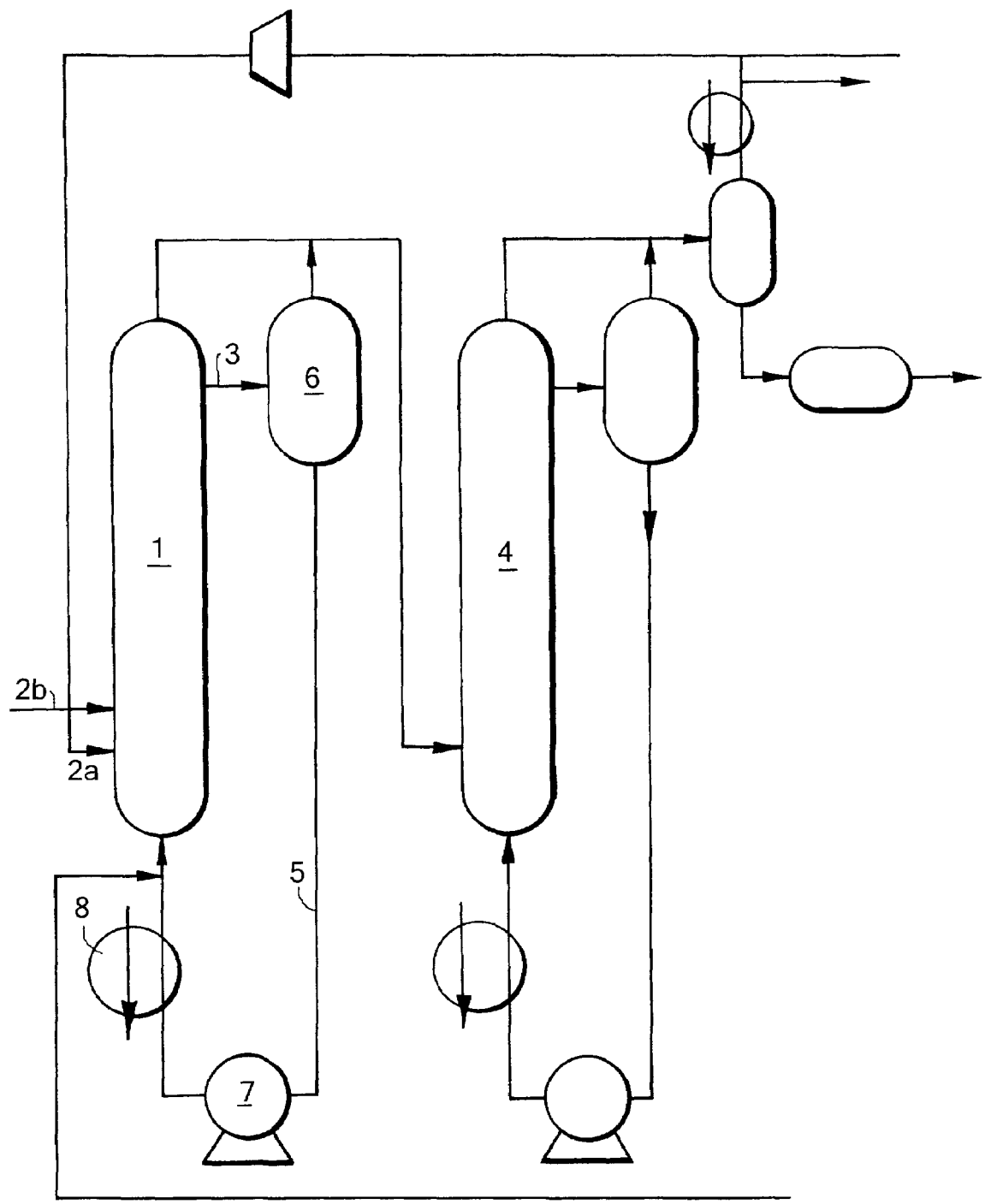
FIG. 1 illustrates a prior art EC/MEG unit.

Utility or Cooling Water (CW), hereinafter referred, may be any external water and can be for example seawater or the like. Intermediate liquid and Chilled liquid are suitably any inert, conditioned liquid such as demineralised water or the like. Suitably CW is at ambient temperature at the location. Suitably Intermediate liquid acts as a heat exchange liquid and varies between a reduced temperature which is less than that of the EC-1 Reactor contents and an elevated temperature resulting from heat exchange with the EC-1 Reactor contents. Preferably the elevated temperature is high enough to drive an absorption refrigeration Unit. Suitably Chilled liquid acts as a heat exchange liquid and varies between a reduced temperature which is less than ambient temperature at the location and an elevated temperature resulting from heat exchange with Consumer Unit(s).

In one embodiment of the heat integration system of the invention a signal from a controller or a Control Unit regulate operation of a control valve to the Shutdown Cooler and a control valve parallel to the Shutdown Cooler, and can optionally initiate a signal to a Control Unit and control valve for the CW supply means to the Shutdown Cooler. Preferably the one or more Control Units send a signal to control valves to control the amount of Intermediate Liquid diverted to the Shutdown Cooler and the amount of Intermediate Liquid bypassing the Shutdown Cooler through the normal route of the Intermediate Loop. Preferably therefore the Control Unit(s) detects the extent to which a value measured by controllers deviates from a setpoint and regulates the extent of opening or closing of control valves to the Shutdown Cooler and optionally to the CW supply means to the Shutdown Cooler.

Preferably the system additionally comprises an EC-1 Reactor Trim Cooler for regulating the temperature of the EC-1 Reactor. Suitably the Trim Cooler is comprised in the EC-1 Reactor liquid recycle. Preferably the Trim Cooler is located downstream of the EC-1 Reactor Cooler and upstream of the EC-1 Reactor in the EC-1 Reactor liquid recycle. Preferably the EC-1 Reactor liquid recycle controller is located downstream of the Trim Cooler at the outlet thereof in the EC-1 Reactor liquid recycle.

In one embodiment the Trim Cooler is under control of the EC-1 Reactor liquid recycle controller which in turn receives signals from the EC-1 Reactor controller, and sends a signal to a control valve for the Trim Cooler CW supply to fine tune or control EC-1 Reactor liquid recycle temperature within a preferred recycle temperature range. This allows the system to maintain a required cooling duty which limits the EC-1 Reactor temperature increase or decrease over or below a setpoint. This embodiment is particularly preferred when the system is installed at a location where ambient temperatures are low and the CW temperature is low (e.g. around 15° C.) because the cooling duty of the Trim Cooler can be carefully controlled. Preferably the EC-1 Reactor liquid recycle controller also sends a signal to the Intermediate Loop Controller which regulates the Shutdown Cooler.

In a particular advantage of this embodiment the Trim Cooler is able to provide precise tuning of the EC-1 Reactor temperature by virtue of its independence of other units, whereas the EC-1 Reactor Cooler is able to provide a greater cooling duty but with less precision due to its dependence on the Intermediate Loop for cooling. Preferably the Trim Cooler is operated up to substantially or approaching the maximum CW flow, at which point the controller on the EC-1 Reactor liquid recycle downstream of the Trim Cooler indicates further cooling requirement which leads to operation or increased duty of the Shutdown Cooler. Conversely if the controller indicates less cooling requirement, the Shutdown Cooler is turned down or, if fully turned down, the Shutdown Cooler is bypassed and the cooling duty continued with the Trim Cooler.

In an alternative embodiment there is a bypass around the Trim Cooler and a control valve is located in the bypass after bypass takeoff. An additional control valve is located at the inlet to the Trim Cooler. The control valve in the Trim Cooler bypass is controlled by a flow controller upstream of the EC-1 Reactor cooler. The control valve at the Trim Cooler inlet is controlled by a temperature controller located downstream of the Trim Cooler (downstream of the point where the by-pass rejoins the EC-1 Reactor liquid recycle stream). In this embodiment a control valve for the Trim Cooler CW supply is not required to control the EC-1 Reactor liquid recycle temperature. This embodiment is particularly preferred for systems where the cooling duty of the Trim Cooler is low (e.g. the duty of the Trim Cooler is 10% and the duty of the EC-1 Reactor cooler is 90%). This is because a relatively high flow of Trim Cooler CW can be maintained even if less cooling is required (as the EC-1 Reactor liquid recycle stream can be diverted around the bypass) and this avoids corrosion that can occur due to chloride accumulation when the flow of Trim Cooler CW is low. If there is no control valve for the Trim Cooler CW supply it is preferred that the control valve at the Trim Cooler inlet has a minimum valve opening to avoid very low temperatures and possible crystallisation of EC in the EC-1 Reactor liquid recycle stream at the Trim Cooler outlet in case of low ambient temperatures.

Preferably controllers and Control Units continuously monitor the measured value and send signals calculated to revert the measured value to a setpoint.

Preferably a Control Unit as hereinbefore defined comprises a processor, and a memory under control of the processor; the memory being programmed with software designed to enable the processor to perform the steps of comparing measured values such as temperature or flow signals with a setpoint value such as temperature or flow, and optionally additionally quantifying any discrepancy above or below the setpoint value, and sending a signal to directly or indirectly regulate a control valve, for example to activate or bypass the Shutdown Cooler or activate the Trim Cooler optionally additionally regulating the level of operation thereof, as hereinbefore defined.

In one embodiment the heat integration system of the invention detects excess temperature in the EC-1 Reactor requiring additional cooling in the Intermediate Loop, or in a second embodiment detects disturbance in or interruption of the Chilled liquid demand by Consumer Unit(s) requiring bypass by Intermediate Liquid of the absorption Refrigeration Unit or in a third embodiment detects insufficient heat generation in the EC-1 Reactor for Chilled liquid generation, for example at start-up, shut-down or in turned down operation, requiring operation of the stand-by supply of Chilled liquid to Consumer Units.

In the first preferred embodiment the controller on the Intermediate Loop at the EC-1 Reactor Cooler inlet sends a numerical signal to an Intermediate Loop Control Unit indicating the measured value as normal or deviant, i.e. corresponds to or deviates from the setpoint, for example shows corresponding or excess temperature, whilst the controller on the Intermediate Loop upstream of the Shutdown Cooler bypass also sends a numerical signal to the Intermediate Loop Control Unit indicating normal or deviant measured value, for example normal Intermediate Liquid flow or zero-flow, the Control Unit receiving normal signals and giving no further signal or a constant signal, or receiving deviant signals and giving a resultant signal to the control valve in the Intermediate Loop bypassing the Shutdown Cooler to reduce flow, and also to the Shutdown Cooler Control Unit which calculates a signal comprising a function of the deviant signal and the resultant signal and sends the calculated signal to the control valve in the Shutdown Cooler bypass to regulate Intermediate Liquid flow to the Shutdown Cooler and maintain a constant flow in the Intermediate Loop.

In a particular advantage the system of the invention in this embodiment provides for continuous heat removal from the EC-1 reactor, and moreover provides smooth temperature control of the EC-1 reactor via the three coolers. The Shutdown Cooler is present in the Shutdown Cooler bypass from the Intermediate Loop with control valves in the bypass to the Shutdown Cooler and in the Intermediate Loop. When insufficient cooling is provided via the absorption Refrigeration Unit and the Trim Cooler, the Shutdown Cooler will take over automatically, via action of the controller in the EC-1 Reactor liquid recycle, for example detecting temperature. The action of the combined controllers and Control Units will keep the total Intermediate Liquid circulation constant in the EC-1 Reactor liquid recycle and the Intermediate Loop and will supply more CW to the Shutdown Cooler.

In the second embodiment a controller in the Chilled Liquid loop from the absorption Refrigeration Unit to the Consumer Unit(s) monitors a measured value relating to the Chilled Liquid Loop temperature downstream of the absorption Refrigeration Unit and detects the measured value as being normal or deviant, i.e. corresponds to or deviates from the setpoint, for example corresponding or depressed temperature indicating normal or deviant consumption of Chilled liquid by Consumer Unit(s), and sends a signal to control valve to maintain flow to or bypass the absorption Refrigeration Unit. Bypassing the absorption Refrigeration Unit in turn is detected as an increase in Intermediate Loop temperature and leads to operation of the Shutdown Cooler as hereinbefore defined. In a particular advantage, bypassing the absorption Refrigeration Unit in a situation in which Consumer Unit demand decreases or ceases avoids excessive cooling in the absorption Refrigeration Unit leading to undesired precipitation of Refrigeration Unit absorbent.

In the third embodiment the stand-by absorption Refrigeration Unit which is driven by an independent energy supply is located in the Chilled Liquid loop in parallel to the absorption Refrigeration Unit, together with a controller downstream of the stand-by absorption Refrigeration Unit and in communication with control valve for the independent energy supply. The controller detects a deviant measured value such as temperature greater than a setpoint indicating insufficient chilling of Chilled liquid and sends a signal to the control valve for the independent energy supply to operate the stand-by absorption Refrigeration Unit to chill liquid flowing in the Chilled Liquid loop for use by Consumer Unit(s). In a particular advantage this provides Chilled liquid when reaction heat is not available from the EC-1 Reactor or when insufficient heat is available to provide Chilled liquid meeting Consumer Unit demand.

By providing an absorption Refrigeration Unit and a stand-by absorption Refrigeration Unit within a single Refrigeration System, the Chilled liquid supply can operate independently of the EC-1 Reactor, under the control of the heat integration system. Preferably the stand-by absorption Refrigeration Unit is driven by low pressure steam.

The present invention therefore provides a cooling system which provides for independent control of the EC-1 reactor temperature, independent control of the Chilled Liquid temperature, and decoupling of the two systems at low throughput, for example at start up, shutdown or during turned down operation, i.e. at anything less than 50% operation of the EC-1 Reactor. More specifically the invention provides for integrated heat removal as part of a heat integration system, and comprises two different Refrigeration Units, an absorption Refrigeration Unit heated by waste heat coupled with an independent stand-by absorption Refrigeration Unit heated by steam. The latter operates in solo mode when the plant is starting up, shutting down or turned down and there is no waste heat available from the EC-1 Reactor, and the former also operates when waste heat is available from the EC-1 Reactor.

In a particular advantage of the invention the stand-by Refrigeration Unit is capable of running the Refrigeration System up to approximately 50% capacity, for example in the range 40 to 60% capacity. Preferably the absorption Refrigeration Unit is in operation when the EC-1 Reactor is running at greater than approximately 50% duty, alone or together with the stand-by Refrigeration Unit, and the stand-by Refrigeration Unit is in operation at least when the EC-1 Reactor is running at less than approximately 50% duty. In this case the Shutdown Cooler is operational for any significant heat removal requirements. Energy may be rationalised by an operator manually turning down the stand-by Refrigeration Unit in the exceptional case that Shutdown cooling is simultaneously operated, avoiding undue consumption of independent energy supplies for cooling duty. It is therefore possible to keep the EC and Consumer Units decoupled at least with respect to heat integration at throughput of up to 50% of design capacity.

As the EC-1 Reactor throughput increases and approaches 50%, the throughput of the rest of the plant similarly increases and approaches 50% and the stand-by absorption Refrigeration Unit can no longer meet demand, whereby the Chilled Loop controller downstream of the absorption Refrigeration Unit indicates an increase in Chilled Loop temperature and the absorption Refrigeration Unit is brought into operation by operation of control valve on the Intermediate Loop upstream of the absorption Refrigeration Unit. Accordingly the Shutdown Cooler Control Systems as hereinbefore defined gradually reduce the Shutdown Cooler duty.

Up to 50% throughput, preferably an operator manually sets the setpoint of the Chilled Liquid Loop controller downstream of the absorption Refrigeration Unit higher than the setpoint of the stand by absorption Refrigeration unit downstream controller in order to force the Chilled Liquid load to be carried by the stand-by absorption Refrigeration Unit. At 50% throughput, manual correction to the setpoint eases off the rate of increase of stand-by absorption Refrigeration Unit contribution.

Once throughput of the EC-1 Reactor exceeds 50%, and increasing demand for Chilled Liquid causes the System to activate the absorption Refrigeration Unit, a transition and eventual switch over is achieved between the Shutdown Cooler and the absorption Refrigeration Unit by gradually reducing the Chilled Liquid Loop controller downstream of the absorption Refrigeration Unit setpoint.

The system of the invention may be used in any catalytic process that makes EC from EO for conversion into MEG. Preferably the system is used in a catalytic process for making MEG that comprises a step in which EO is allowed to react with $CO_2$ in the presence of a catalyst thereby effecting formation of a reaction solution containing EC, a hydrolysis step in which the reaction solution is converted into a MEG aqueous solution by hydrolysing EC in the reaction solution and a distillation step in which purified MEG and a catalyst solution containing the catalyst are obtained from the MEG aqueous solution by distillation. Preferably the catalyst is present in a bubble column reactor together with EO, $CO_2$, water and MEG. Preferably the system is operated with a process side temperature in the range 50-200° C., more preferably 70-170° C., more preferably 90-150° C., most preferably 100-127° C.

Preferably the EC-1 Reactor operates at an inlet temperature in the range 70-110° C. Preferably the EC-1 Reactor is supplied by pure EO or an aqueous EO mixture from a pump providing a desired fluid rate, $CO_2$ from a recycle $CO_2$ compressor, catalyst solution from a pump providing a desired fluid rate and EC-1 Reactor liquid recycle (from heat exchange with the Intermediate cooling loop and the Trim Cooler) also from a pump providing a desired fluid rate. Suitably the EC-1 Reactor liquid recycle flow comprises 50 to 95% for example 80-92% of the total reactor feed flow whereby it is able to provide reactor cooling and temperature control for the exothermic EC reaction. Preferably the Trim Cooler regulates a temperature increase over the EC-1 Reactor as hereinbefore defined, providing a high MEG selectivity.

Preferably the Reactor Shutdown Cooler and the Trim Cooler are capable of together removing at least 50% of the duty of the EC-1 Reactor.

In a particular advantage the heat integration system may be operated as a closed loop system including the EC-1 Reactor Cooler, the Intermediate Cooling loop and the absorption Refrigeration Unit. However it is necessary to ensure that the EC-1 Reactor or the Chilled Liquid Consumer(s) can operate independently, which necessitates the different Coolers and Refrigeration Units being operated as a closely integrated system, employing the two absorption Refrigeration Units in the heat integration system as hereinbefore defined. The heat integration system of the invention provides operational flexibility for start up and shut down of the EC-1 Reactor by decoupling the EO and MEG sections.

We have found that the system of the invention provides for the first time three different modes of operation as hereinbefore defined plus total flexibility including heat integration itself. In a particular advantage the application of a closed Intermediate Loop provides for smooth heat integration. A smooth heat integration is important to keep the overall steam consumption competitive.

The heat integration system of the invention may be operated with any suitable absorption Refrigeration Unit as known in the art which operates on the principle of evaporating cooling fluid at low pressure and absorption in an absorbent for the fluid. Preferably cooling fluid is water and the absorbent is a lithium bromide solution which is a strong absorbent for water. Each absorption Refrigeration Unit comprises two shells, installed at different elevations. The lower shell is divided into an absorber and an evaporator section while the upper shell consists of a generator and condenser. The Refrigeration Units for use in the system of the invention preferably comprise a single desorber only, not a multiple, e.g. two-stage, desorber. Heat of evaporation of cooling fluid is supplied by the fluid to be cooled. A pressure gradient is achieved by absorption. The heat removed from the EC-1 reactor and/or external energy are used to drive the Refrigeration Unit generators.

Preferably the heat integration system is used in conjunction with a two phase separator for separating two phase flow in a side draw from the EC-1 Reactor in a first compartment providing liquid recycle to EC-1 and a second compartment providing a two phase flow to a second EC Reactor EC-2, such that the two phase flow to EC-2 Reactor is stable. Preferably the separator operates without a liquid level in the second compartment to drive the two phase flow to EC-2 Reactor, thereby avoiding the risk of a liquid level building up and flooding the separation vessel, and upsetting the removal of gas from the liquid recycle. Vapour disengagement from the liquid recycle is important to avoid cavitation in the reactor circulation pump present in the EC-1 Reactor liquid recycle.

Preferably the two phase separator is located in the side draw from the EC-1 Reactor and comprises means to separate two phase gas-liquid side draw outlet from the EC-1 Reactor into a first liquid phase component for cooling and recycle to EC-1 Reactor, a second gas-liquid two phase stream as feed for further reaction in EC-2 and a gas phase component as feed for further reaction in EC-1 or EC-2. A similar separator is suitably present in a side draw from the EC-2 Reactor.

Preferably the two phase separator comprises a normally horizontal vessel defining a liquid space and a gas space above the liquid space, wherein the vessel has an inlet end space provided with a feed inlet and an outlet end space provided with separate outlets for the liquid phase, gas-liquid phase and gas phase components, wherein the vessel further comprises an inlet device comprising a primary gas-liquid separator which is arranged in the gas space and a tilted return tray arranged in the gas space under the primary separator having a lower end that is located near the inlet end wall of the vessel feeding the liquid space such that a passage is defined between the lower end and the inlet end wall, the vessel additionally comprising a distribution calming baffle in the liquid space. The distribution calming baffle serves to disengage any gas entrained with liquid from the inlet device whereby liquid exiting the liquid phase outlet is gas-free. Preferably an overflow weir in the outlet end space ensures that there is no liquid level above the gas-liquid phase outlet whereby gas exits together with liquid as two-phase gas-liquid flow, for example via a cyclone effect which may be achieved via a specially shaped outlet nozzle such as a conical nozzle. The two phase separator may comprise a vortex breaker in the liquid phase outlet.

The two-phase separator may be as defined in U.S. Pat. No. 6,537,458B1, which discloses a three-phase separator operating on a similar principle, the contents of which are incorporated herein by reference. Preferably the separator comprises a horizontal gas-liquid separator comprising a plurality of baffles and a plurality of calming sections to confer flow patterns providing liquid removal from two phase flow mixture.

Preferably the $CO_2$ recycle flow is reduced during turned down operation of the EC-1 Reactor to ensure good gas separation in the separators.

In a further aspect of the invention there is provided a novel separator for separating two phase flow in a side draw from the EC-1 Reactor in a first compartment providing liquid recycle to EC-1 and a second compartment providing a two phase flow to a second EC Reactor EC-2, such that the two phase flow to EC-2 Reactor is stable, as hereinbefore defined.

In a further aspect of the invention there is provided a control system for controlling the heat integration system as hereinbefore defined comprising a plurality of controllers, Control Units and/or control valves wherein the controllers provide signals relating to EC-1 Reactor loading and Consumer Unit(s) demand, to controllers or Control Units or a combination thereof, and/or to control valves regulating operation of the Shutdown Cooler and the absorption Refrigeration Unit. Preferably controllers are located as hereinbefore defined.

Further advantages and features of the control system correspond to advantages and features of corresponding components referred to in the context of the heat integration system as hereinbefore defined.

In a further aspect of the invention there is provided a heat integration method and a control method corresponding to the heat integration system and control system as hereinbefore defined.

In a further aspect of the invention there is provided a computer program suitable for enabling the heat integration system and the control system or any component thereof to perform the steps as hereinbefore defined.

In a further aspect of the invention there is provided the use of the heat integration system, separator, control system or program in a process for producing EC from EO for conversion into MEG, as hereinbefore defined.

In FIG. 1 EC-1 Reactor (1) has inlets for aqueous $CO_2$ (2a) and EO (2b) and outlet (3) to separator (6) for product EC and unreacted gases and liquids which pass through separator (6) which feeds product fluids and unreacted fluids to the feedline to EC-2 Reactor (4) and recycles reaction liquid as liquid recycle (5) with pump (7) via heat exchanger (8) to remove heat before returning to EC-1 Reactor (1). A similar line up is shown at EC-2 Reactor (4) but in this case recycle is heated.

Figure 2:
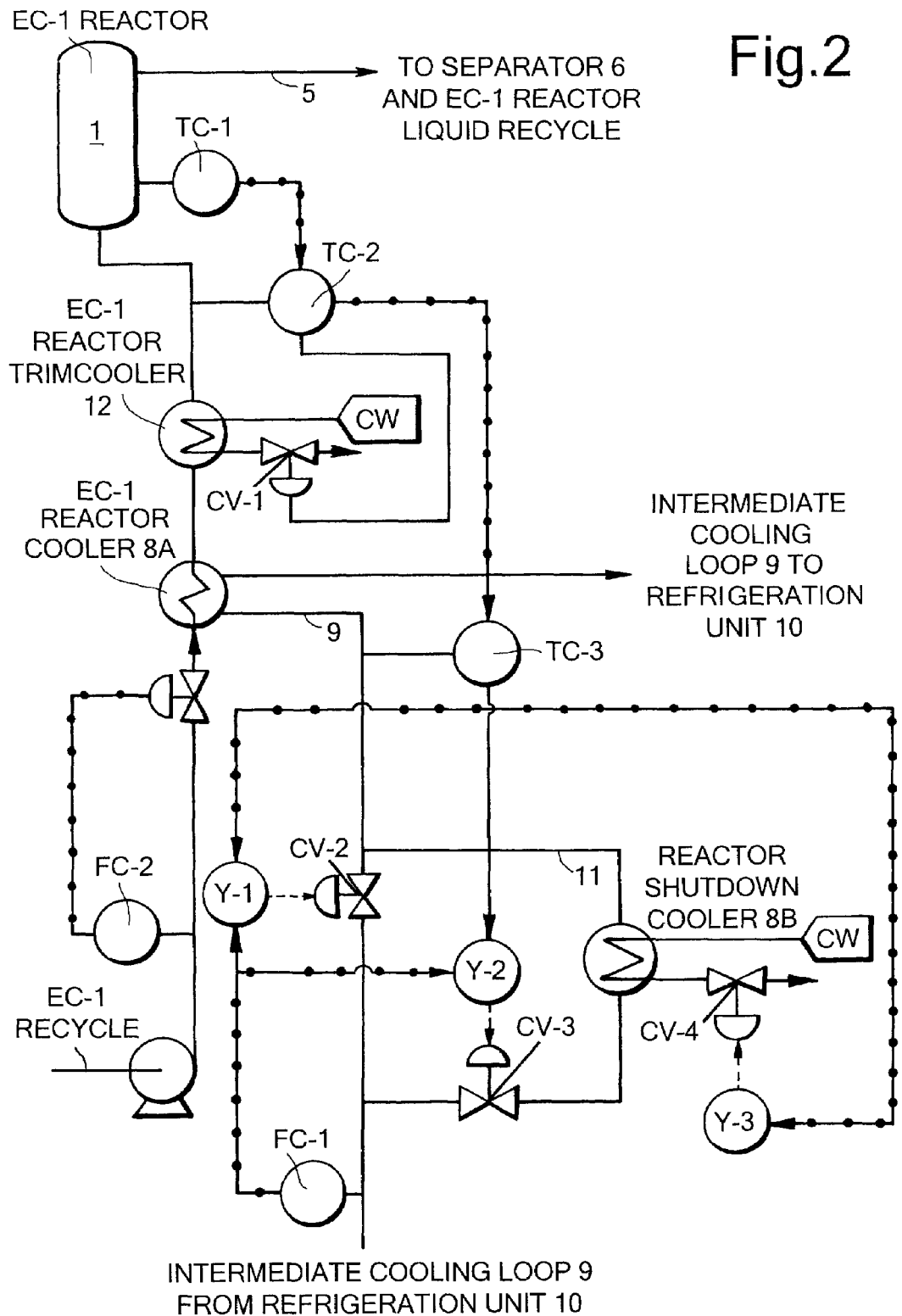
FIGS. 2 to 5 illustrate embodiments of the heat integration system and control system of the invention.

In FIG. 2 EC-1 Reactor liquid recycle (5) separated by separator (6) passes to EC-1 Reactor Cooler (8a). EC-1 Reactor Cooler (8a) is in heat exchange with Intermediate Loop (9) in turn in heat exchange with absorption Refrigeration Unit (10). Shutdown Cooler (8b) located in Shutdown Cooler bypass (11) as a bypass from Intermediate Loop (9) is supplied with independent CW. EC-1 Reactor Trim Cooler (12) is located downstream from EC-1 Reactor Cooler (8a) in EC-1 Reactor liquid recycle (5).

Temperature controller TC-1 is located on the EC-1 Reactor (1), TC-2 is located on the EC-1 Reactor liquid recycle (5) downstream of Trim Cooler (12), and TC-3 is located on Intermediate Loop (9) upstream of EC-1 Reactor Cooler (8a).

Control valve CV-1 is located on the CW supply for EC-1 Reactor Trim Cooler (12), CV-2 on Intermediate Loop (9) parallel to the bypass to Shutdown Cooler (8b), CV-3 is located in the Shutdown Cooler bypass (11), CV-4 is located at the CW inlet to Shutdown Cooler (8b) and CV-5 is located on the EC-1 Reactor liquid recycle (5) upstream of reactor cooler 8a.

Flow controller FC-1 is located on Intermediate Loop (9) upstream of the bypass to Shutdown Cooler (8b) and FC-2 is located on the EC-1 Reactor liquid recycle (5) upstream of reactor cooler 8a.

TC-1 communicates with EC-1 Reactor and sends signals to TC-2. TC-2 communicates with EC-1 Reactor liquid recycle and TC-1 and sends signals to TC-3 and CV-1. TC-3 communicates with Intermediate Loop (9) and sends signals to three Control Units Y-1, Y-2 and Y-3. Control Unit Y-1 communicates with FC-1 and TC-3 and passes signals to CV-2, Y-2 communicates with FC-1 and TC-3 via Y-1 and passes signals to CV-3, and Y-3 communicates with TC-3 and passes signals to CV-4. FC-2 communicates with EC-1 Reactor liquid recycle (5) and sends signals to CV-5.

In the heat integration system the EC-1 Reactor temperature is always regulated. When TC-1 detects temperature in excess of a set-point, typically at start up, it operates Trim Cooler (12) opening the control valve CV-1 to a desired extent until, at approximately 90% aperture, Reactor Cooler (8a) and Shutdown Cooler (8b) will be operated by opening or closing control valves CV-2, CV-3 and CV-4 to absorb part of the cooling duty.

Control Units Y-1, Y-2 and Y-3 ensure that the flow in Intermediate Loop (9) remains constant, by means of programmed algorithms, whereby if controllers TC-3 and FC-1 receive signals and determine as normal, they send a signal to open CV-2 fractionally, and if FC-1 receives a signal and determines as too high, it sends a signal to close CV-2 fractionally. For example Y-1 calculating the product of 0, fractional or 1 signal (a) from FC-1 and 0, fractional or 1 signal (b) from TC-3 to determine a 0, fractional or 1 signal (a.b) to CV-2, and Y-2 receiving the same signals and calculating a factor thereof (1-a(1-k.b)) to determine a 0, fractional or 1 signal to CV-3 which regulates opening of CV-3.

Flow controller FC-2 ensures that the flow in EC-1 Reactor recycle remains constant. If FC-2 receives a signal and determines that the flow is too high, it sends a signal to close CV-5 fractionally; conversely if the signal is that the flow is too low, it sends a signal to open CV-5 fractionally.

Figure 7:
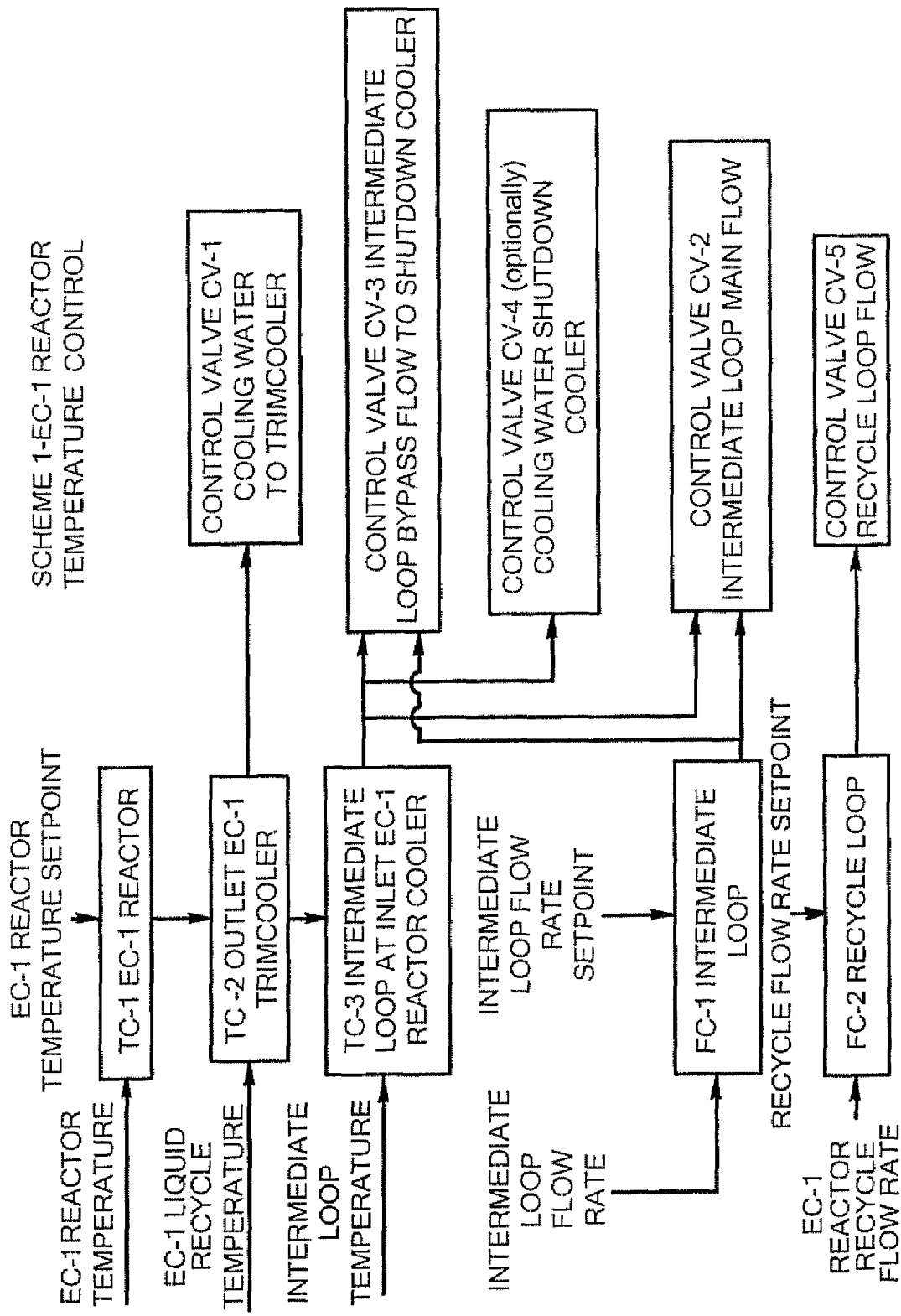
FIGS. 7-10 are schematic flow diagrams of temperature control systems of the invention.

Scheme 1 in FIG. 7 shows operation of the heat integration system of the invention in controlling EC-1 Reactor temperature. TC-1 receives a temperature input from EC-1 Reactor and compares with an EC-1 Reactor temperature setpoint, generating a signal to TC-2. TC-2 receives a temperature input from EC-1 Reactor Liquid Recycle and signal from TC-1, and generates a signal to TC-3 and a signal to CV-1, opening CW flow in case the signal requests cooling via Trim Cooler (12). TC-3 receives a temperature input from Intermediate Loop (9) and signal from TC-2, and generates a signal to CV-3, opening Intermediate loop control valve CV-3 to Shutdown Cooler (8b) bypass, and also generates a signal to CV-4 opening CW to Shutdown Cooler. Simultaneously TC-3 sends a signal to CV-2 regulating flow in the Intermediate Loop parallel to the Shutdown Cooler bypass, and FC-1 receives an Intermediate Loop flow rate input and compares to a setpoint and sends a signal to CV-3, whereby Intermediate Loop flow is maintained constant. FC-2 receives an Recycle Loop flow rate input and compares to a setpoint and sends a signal to CV-5, whereby Recycle Loop flow is maintained constant.

Figure 3:
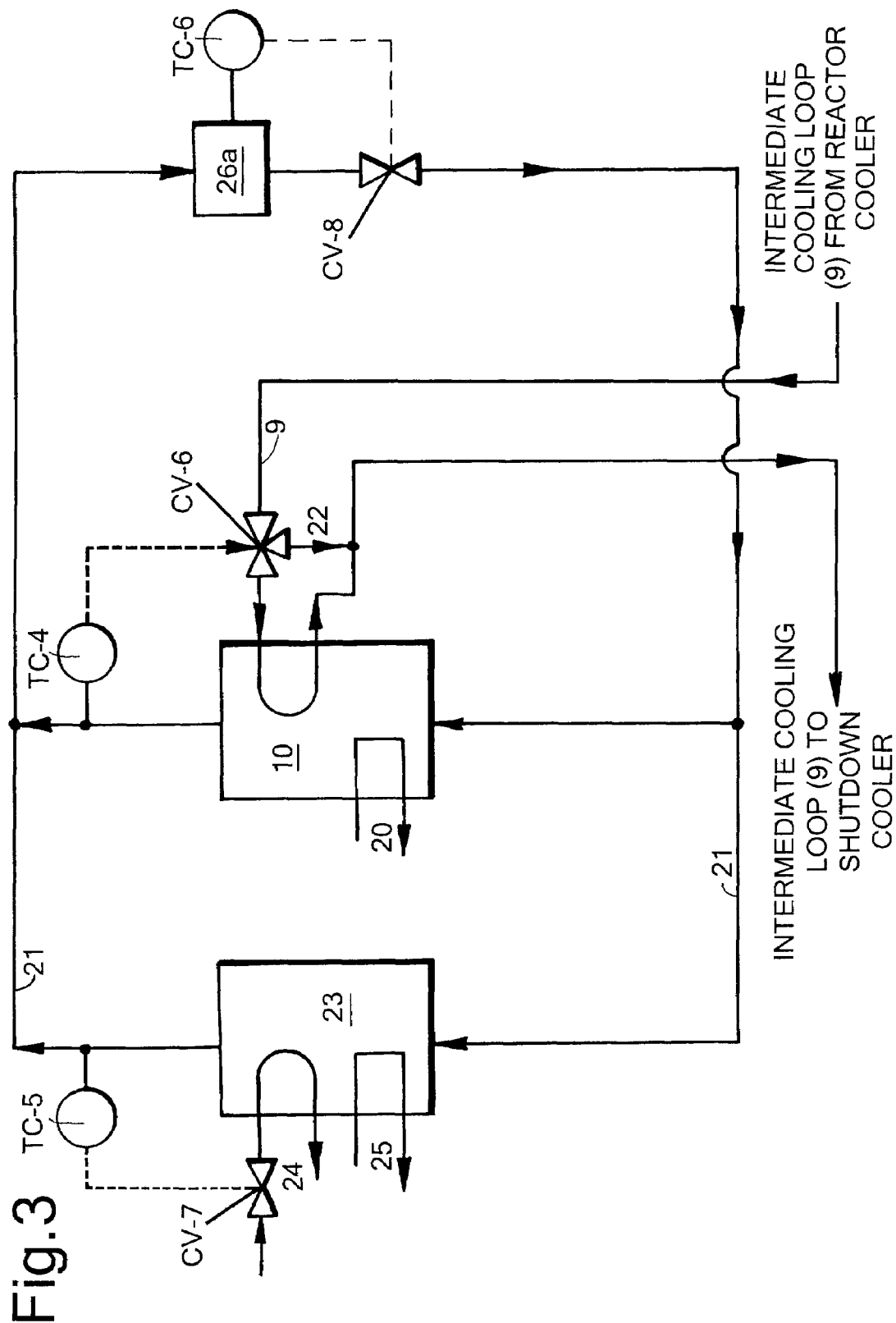

In FIG. 3 is shown absorption Refrigeration Unit (10) which is supplied with CW (20) for removing heat of reaction from Intermediate liquid flowing in the Intermediate loop (9). Chilled liquid generated by absorption Refrigeration Unit (10) is passed by Chilled liquid loop (21) to Consumer Unit 26(a). Temperature Controller (TC-4) on Chilled liquid loop (21) passes signals to 3-way control valve (CV-6) on Intermediate Loop (9) upstream of absorption Refrigeration Unit (10) and at bypass (22) of absorption Refrigeration Unit (10). Stand-by absorption Refrigeration Unit (23) is driven by independent steam (24) and is supplied with CW (25). Temperature controller TC-5 is located on Chilled liquid loop (21) downstream of stand-by absorption Refrigeration Unit (23) and communicates with control valve CV-7 on independent steam (24) inlet. Stand-by absorption Refrigeration Unit (23) is driven by steam (24) and generates Chilled liquid for Chilled liquid loop (21).

Temperature Controller TC-6 located on the outlet of the process side of the Consumer Unit (26a) sends signals to control valve CV-8 located on Chilled liquid loop (21) downstream of Consumer Unit (26a). More than one Consumer Units (26b etc) may be located in parallel to Consumer Unit (26a) on Chilled liquid loop (21). Additional Consumer Units are associated with corresponding temperature controllers and control valves.

The Chilling duty of absorption Refrigeration Units (10, 23) is so high that each may comprise multiple separate sub-units that function together as a single unit, for example any number of machines, in order to manage a greater Consumer Unit duty.

At start-up, turn down operation or shut-down, stand-by Refrigeration Unit (23) is in operation and Shutdown Cooler (8b, FIG. 2) is in operation partially or fully. At greater than approximately 50% EC-1 Reactor duty, the absorption Refrigeration Unit (10) is in operation and Reactor Cooler (8a, FIG. 2) and Trim Cooler (12, FIG. 2) are in combined operation.

Figure 8:
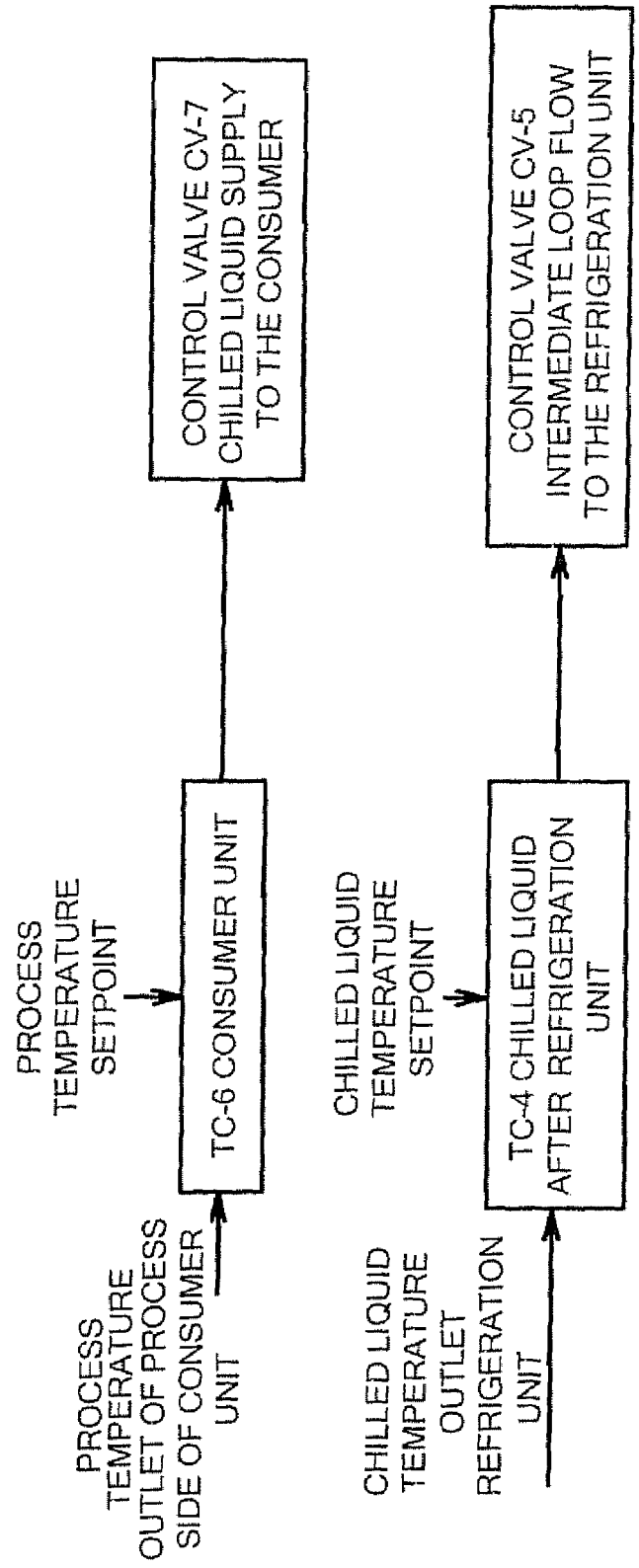

Scheme 2 in FIG. 8 shows operation of the heat integration system of the invention in controlling absorption Refrigeration Unit (10) temperature. TC-6 receives a temperature input from outlet of process side of Consumer Unit (26a) and compares with a Consumer Unit process temperature outlet setpoint, and sends a signal to CV-7 to operate or regulate Chilled liquid flow to Consumer Unit (26a). CV-7 may be located before or after Consumer Unit (26a).

TC-4 receives a temperature input from the outlet of the absorption Refrigeration Unit (10) and compares to a setpoint absorption Refrigeration Unit outlet temperature, and sends a signal to CV-5 to open the 3-way control valve to the absorption Refrigeration Unit (10) or open the 3 way control valve (CV-5) to the bypass (22) if TC-4 shows a temperature respectively more or less than the setpoint.

Figure 4:
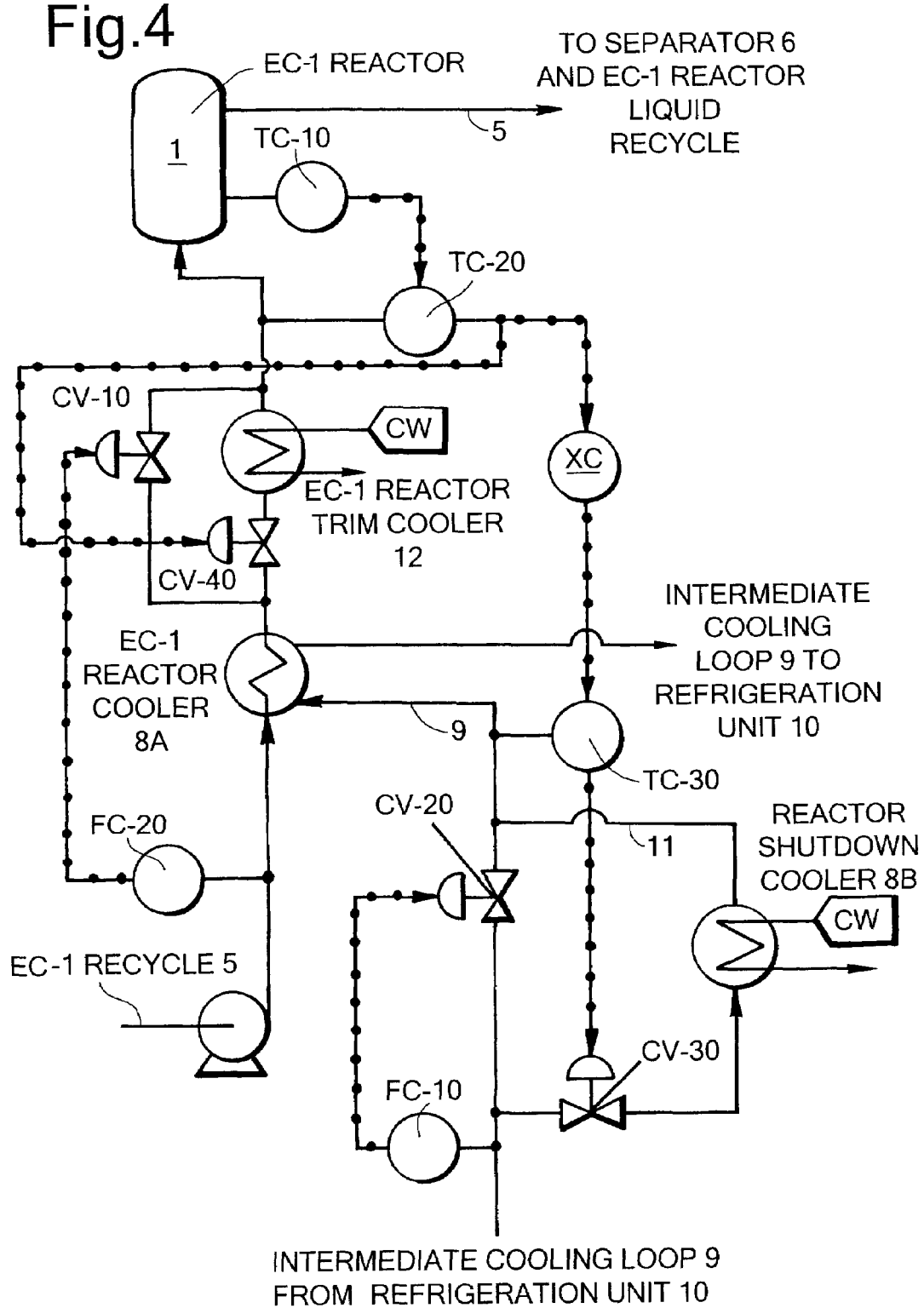

In FIG. 4 EC-1 Reactor liquid recycle (5) separated by separator (6) passes to EC-1 Reactor Cooler (8a). EC-1 Reactor Cooler (8a) is in heat exchange with Intermediate Loop (9) in turn in heat exchange with absorption Refrigeration Unit (10). Shutdown Cooler (8b) located in Shutdown Cooler bypass (11) as a bypass from Intermediate Loop (9) is supplied with independent CW. EC-1 Reactor Trim Cooler (12) is located downstream from EC-1 Reactor Cooler (8a) in EC-1 Reactor liquid recycle (5).

Temperature controller TC-10 is located on the EC-1 Reactor (1), TC-20 is located on the EC-1 Reactor liquid recycle (5) downstream of Trim Cooler (12), and TC-30 is located on Intermediate Loop (9) upstream of EC-1 Reactor Cooler (8a).

Control valve CV-10 is located on a bypass around the Trim Cooler (12), CV-20 on Intermediate Loop (9) parallel to the bypass to Shutdown Cooler (8b), CV-30 is located on the Shutdown Cooler bypass at the inlet to the Reactor shutdown cooler (11), and CV-40 is located on the EC-1 Reactor liquid recycle (5) between the Reactor Cooler (8A) and the Trim Cooler (12) (downstream of bypass take-off at the inlet of trim cooler).

Flow controller FC-10 is located on Intermediate Loop (9) upstream of the bypass to Shutdown Cooler (8b) and FC-20 is located on the EC-1 Reactor liquid recycle (5) upstream of reactor cooler 8a.

TC-10 communicates with EC-1 Reactor and sends signals to TC-20. TC-20 communicates with EC-1 Reactor liquid recycle (5) and TC-10 and sends signals to CV-40 and valve position controller XC. TC-30 communicates with Intermediate Loop (9) and XC and sends signals to CV-3. FC-10 communicates with Intermediate Loop (9) and sends signals to CV-20. FC-20 communicates with EC-1 Reactor liquid recycle (5) and sends signals to CV-10.

In the heat integration system the EC-1 Reactor temperature is always regulated. When TC-10 detects temperature in excess of a set-point, it communicates with TC-20, which acts upon valve CV-40, increasing the flow through the Trim Cooler (12). When FC-20 detects a flow in excess of a set-point, it sends a signal to open CV-10 which increases the flow via the Trim Cooler bypass (reducing the flow through the Trim Cooler).

The flow in Intermediate Loop (9) is always regulated. When FC-10 detects a flow in excess of a set-point, it sends a signal to close CV-20 fractionally. The temperature in Intermediate Loop (9) is regulated. When TC-30 detects a temperature in excess of a set-point, it sends a signal to open CV-30 fractionally which increases the flow via the Reactor Shutdown Cooler (8b).

To ensure that TC-20 remains in control, the set point of TC-30 is adjusted by valve position controller XC. Limits on the output of TC-20 and TC-30 are applied to keep these controllers in range.

Figure 9:
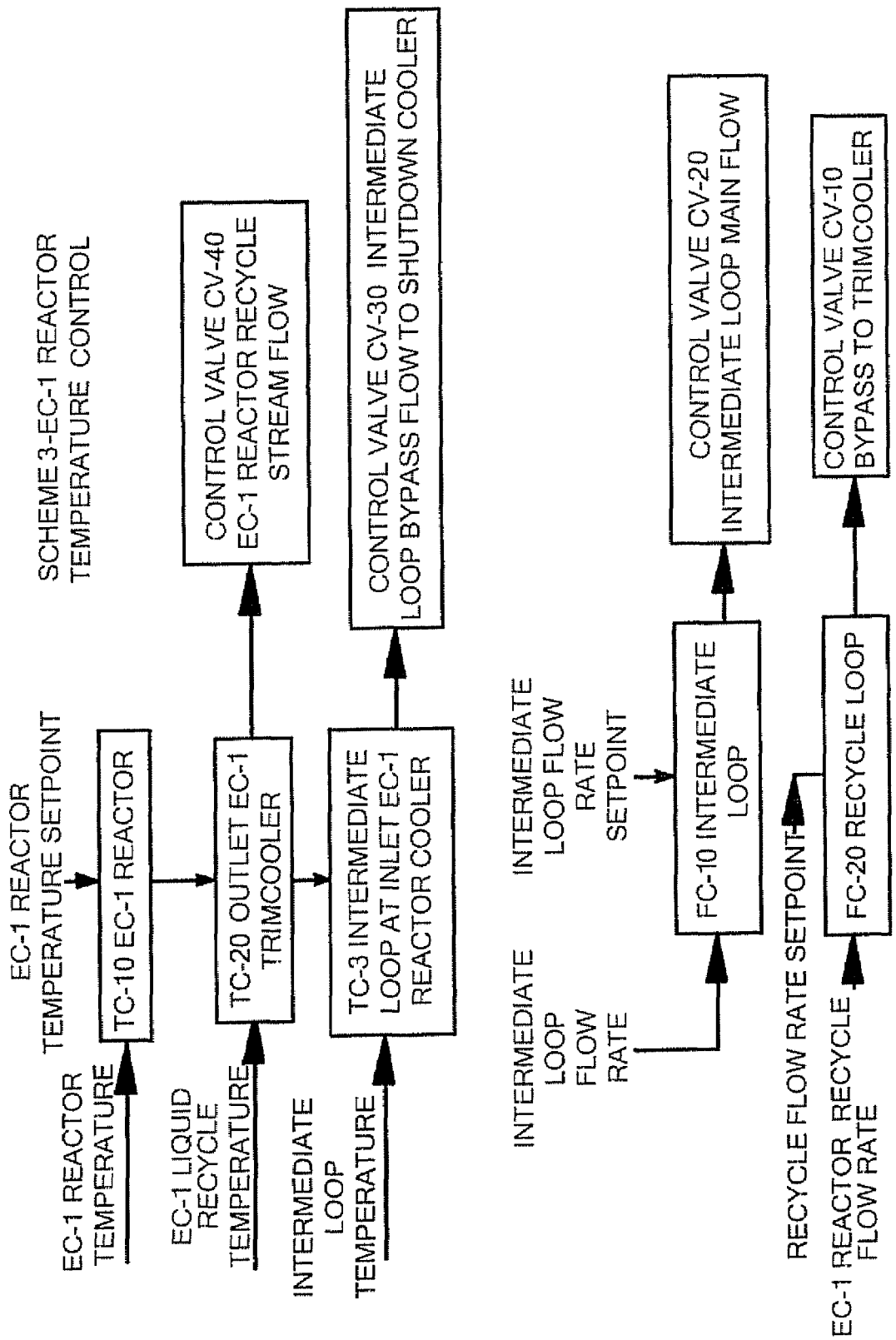

Scheme 3 in FIG. 9 shows operation of the heat integration system of the invention in controlling EC-1 Reactor temperature. TC-10 receives a temperature input from EC-1 Reactor and compares with an EC-1 Reactor temperature setpoint, generating a signal to TC-20. TC-20 receives a temperature input from EC-1 Reactor Liquid Recycle and signal from TC-10, and generates a signal to CV-40, opening the valve in case the signal requests increased cooling via Trim Cooler (12). TC-30 receives a temperature input from Intermediate Loop (9), and generates a signal to CV-30, opening Intermediate loop control valve CV-30 to Shutdown Cooler (8b) bypass. FC-10 receives an Intermediate Loop flow rate input and compares to a setpoint and sends a signal to CV-20, whereby Intermediate Loop flow is maintained constant. FC-20 receives a Recycle Loop flow rate input and compares to a setpoint and sends a signal to CV-10, whereby Recycle Loop flow is maintained constant.

Figure 5:
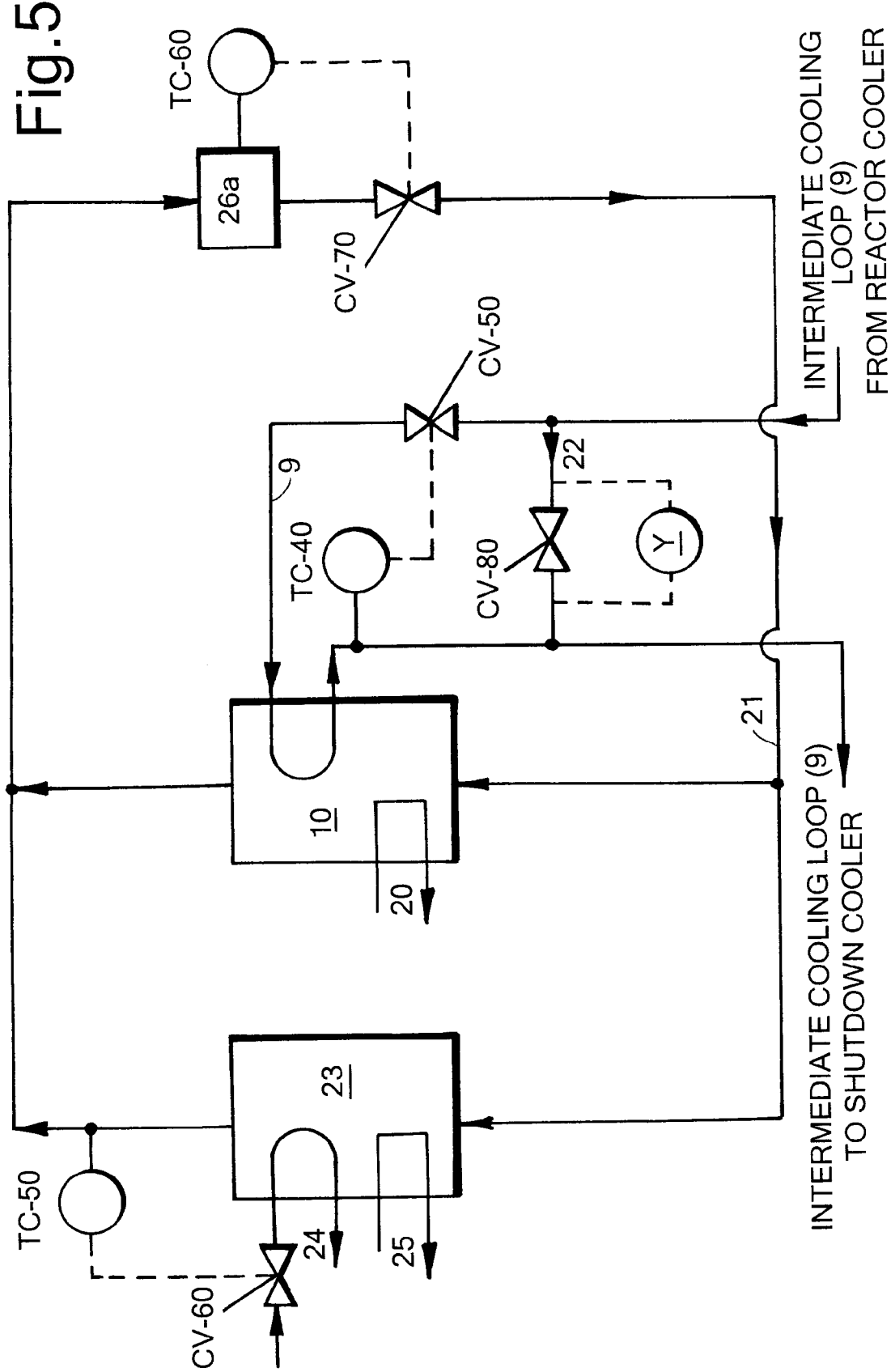

In FIG. 5 is shown absorption Refrigeration Unit (10) which is supplied with CW (20) for removing heat of reaction from Intermediate liquid flowing in the Intermediate loop (9). Chilled liquid generated by absorption Refrigeration Unit (10) is passed by Chilled liquid loop (21) to Consumer Unit 26(*a*). Temperature Controller (TC-40) on Intermediate Loop (9) downstream of absorption Refrigeration Unit (10) passes signals to control valve (CV-50) on Intermediate Loop (9) upstream of absorption Refrigeration Unit (10). Differential pressure control is applied on the bypass (22) of absorption Refrigeration Unit (10) by a Control unit (Y) to maintain a constant flow in case any of the refrigeration units fails.

Stand-by absorption Refrigeration Unit (23) is driven by independent steam (24) and is supplied with CW (25). Temperature controller TC-50 is located on Chilled liquid loop (21) downstream of stand-by absorption Refrigeration Unit (23) and communicates with control valve CV-7 on independent steam (24) inlet. Stand-by absorption Refrigeration Unit (23) is driven by steam (24) and generates Chilled liquid for Chilled liquid loop (21).

Temperature Controller TC-60 located on the outlet of the process side of the Consumer Unit (26*a*) sends signals to control valve CV-70 located on Chilled liquid loop (21) downstream of Consumer Unit (26*a*). More than one Consumer Units (26*b* etc) may be located in parallel to Consumer Unit (26*a*) on Chilled liquid loop (21). Additional Consumer Units are associated with corresponding temperature controllers and control valves.

The Chilling duty of absorption Refrigeration Units (10, 23) is so high that each may comprise multiple separate sub-units that function together as a single unit, for example any number of machines, in order to manage a greater Consumer Unit duty. The differential pressure control applied on the bypass ensures smooth operation and constant flow through to sub-units of absorption Refrigeration Unit (10).

At start-up, turn down operation or shut-down, stand-by Refrigeration Unit (23) is in operation and Shutdown Cooler (8*b*, FIG. 4) is in operation partially or fully.

At greater than approximately 50% EC-1 Reactor duty, the absorption Refrigeration Unit (10) is in operation and Reactor Cooler (8*a*, FIG. 4) and Trim Cooler (12, FIG. 4) are in combined operation.

Figure 10:
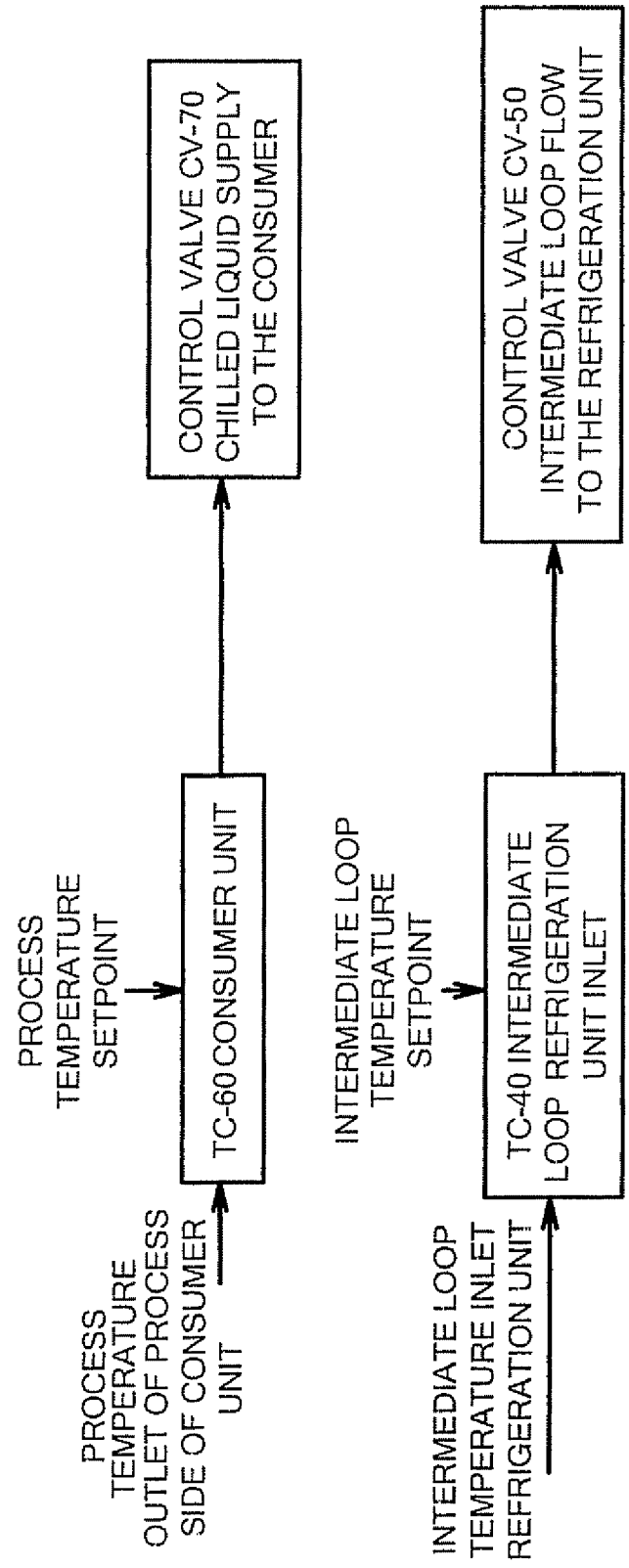

Scheme 4 in FIG. 10 shows operation of the heat integration system of the invention in controlling absorption Refrigeration Unit (10) temperature. TC-60 receives a temperature input from outlet of process side of Consumer Unit (26*a*) and compares with a Consumer Unit process temperature outlet setpoint, and sends a signal to CV-70 to operate or regulate Chilled liquid flow to Consumer Unit (26*a*). CV-70 may be located before or after Consumer Unit (26*a*).

TC-40 receives a temperature input from the Intermediate Loop (9) upstream of the Refrigeration Unit (10) and compares to a setpoint Intermediate Loop temperature, and sends a signal to CV-50 to open the control valve to the absorption Refrigeration Unit (10) if TC-40 shows a temperature more than the setpoint.

Figure 6:
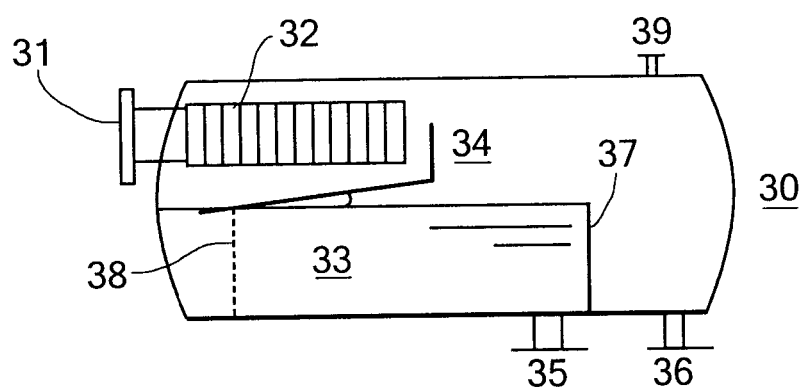
FIG. 6 illustrates a separator for use in the systems of the invention.

In FIG. 6 is shown two phase separator (30) comprising EC-1 Reactor sidedraw gas/liquid inlet (31), gas-liquid inlet device (32), liquid space (33), gas space (34), EC-1 Reactor liquid recycle outlet (35), reconstituted two phase flow outlet (36) to EC-2 Reactor (not shown), overflow weir (37) and calming baffle (38). Bleed (39) prevents stagnant gas accumulation. The majority of gas from inlet (31) is separated in inlet device (32) and exits directly via outlet (36). An amount of gas is entrained as bubbles with liquid from inlet device (32) and passes through calming baffle (38) into liquid space (33) where it rises and disengages from liquid and enters gas space (34). Liquid exiting outlet (35) is therefore gas-free and exits as substantially single phase liquid flow. Overflow weir (37) ensures that there is no liquid level above outlet (36) whereby gas exits together with liquid as two-phase gas-liquid flow, for example via a cyclone effect. This can be achieved via a specially shaped (e.g. conical) outlet nozzle. A liquid level above outlet (36) would prevent gas being drawn into outlet (36).

EXAMPLES

Example 1

Energy Efficiency

Duty of EC-1 Reactor Cooler is converted into Chilled liquid, this energy would otherwise be wasted. The heat integration system of the invention represents a saving equal to the duty of the EC-1 Reactor Cooler. For a world scale plant this is of the order of 12 MW.

Example 2

Safety

The invention allows decoupled independent operation of the EC-1 Reactor and Consumer Units under specific circumstances. Thereby there can be no possibility of EC-1 Reactor runaway due to insufficient Chilled water demand from Consumer Unit(s), and also there can be no possibility of Consumer problems due to insufficient Chilled water available at start-up, turned down operation or shut-down of the EC-1 Reactor.

Example 3

Separator

The prior art separator (6) of FIG. 1 is a standard gas-liquid separator which operates on a liquid level in the bottom of the separator having a separation surface area and thereabove a two phase gas-liquid zone in the top of the separator. The separator therefore requires sufficient height for separation and needs a low superficial velocity in the bottom of the separator. The EC-1 Reactor liquid recycle inlet (31) needs to increase in order to achieve the necessary capacity. The design requirements for the vessel are a certain maximum residence time and a certain maximum superficial liquid velocity to ensure vapour disengagement in the bottom of the separator. The application of these design requirements would lead to a very flat pancake shaped vessel with a very high degree of turbulence that would lead to very poor vapour disengagement in the bottom of the separator.

Separator (6) of FIG. 6 meets the required residence time in the liquid phase and achieves the required gas removal from inlet (31) in inlet device (32), the separated gas exiting directly via outlet (36). Liquid exiting outlet (35) is therefore substantially gas-free and exits as single phase liquid flow, ensuring that EC-1 Reactor liquid recycle pump can operate without cavitation. Substantially 100% gas exits together with liquid as two-phase gas-liquid via outlet (36).

The invention claimed is:

1. A heat integration system for removing heat of reaction from an EC-1 Reactor in which ethylene carbonate (EC) is produced from ethylene oxide (EO) for conversion into monoethylene glycol (MEG) and generating Chilled liquid for use by one or more Consumer Units, wherein the system comprises an EC-1 Reactor Cooler suitable for removing heat from an EC-1 Reactor, wherein the EC-1 Reactor Cooler is located in an EC-1 Reactor Liquid Recycle which comprises a side draw and liquid recycle, said liquid recycle comprised of reaction liquid, from the EC-1 Reactor, an Intermediate Loop which is in communication with the Reactor Cooler and with an absorption Refrigeration Unit, and which is suitable for conducting Intermediate liquid therebetween to transfer said heat from the EC-1 Reactor to the absorption Refrigeration Unit to drive the absorption Refrigeration Unit, the absorption Refrigeration Unit being suitable for generating Chilled liquid, and a Chilled liquid loop suitable for conducting Chilled liquid generated in the absorption Refrigeration Unit for use by one or more Consumer Units, the system being such that the absorption Refrigeration Unit uses heat generated in the EC-1 Reactor to generate Chilled liquid for the Chilled liquid loop and Consumer Unit(s), wherein the system additionally comprises a Shutdown Cooler having an independent cooling source which is suitable, alternatively or in addition to the absorption Refrigeration Unit, for removing heat from the EC-1 Reactor, and wherein the system additionally comprises an independent stand-by source of Chilled liquid which is suitable, alternatively or in addition to the absorption Refrigeration Unit, for generating chilled liquid, to serve the one or more Consumer Units.

2. A heat integration system according to claim 1, wherein the Intermediate Loop includes a bypass of the absorption Refrigeration Unit whereby Intermediate cooling liquid may be conducted to the absorption Refrigeration Unit for heat removal or may bypass the absorption Refrigeration Unit.

3. A heat integration system according to claim 1, which comprises a plurality of controllers, a plurality of control valves and one or more Control Units wherein the controllers provide signals relating to the EC-1 Reactor loading and the Consumer Unit(s) demand, to the controllers or Control Units or a combination thereof.

4. A heat integration system according to claim 1, which comprises a plurality of controllers, a plurality of control valves and one or more Control Units wherein the controllers provide signals relating to the EC-1 Reactor loading and the Consumer Unit(s) demand to control valves regulating operation of the Shutdown Cooler and of the absorption Refrigeration Unit.

5. A heat integration system according to claim 1, which additionally comprises an EC-1 Reactor Trim Cooler for regulating the temperature of the EC-1 Reactor, located downstream of the EC-1 Reactor Cooler and upstream of the EC-1 Reactor in the EC-1 Reactor liquid recycle.

6. A heat integration system according to claim 5, wherein the Trim Cooler is under control of an EC-1 Reactor liquid recycle controller which in turn receives signals from an EC-1 Reactor controller, and sends a signal to a control valve for the Trim Cooler CW supply to control the EC-1 Reactor liquid recycle temperature within a preferred recycle temperature range.

7. A heat integration system according to claim 5, wherein there is a bypass around the Trim Cooler and a control valve is located in the bypass, wherein the control valve located in the bypass is controlled by a flow controller upstream of the EC-1 Reactor cooler; and a control valve is located at the inlet to the Trim Cooler and the control valve at the Trim Cooler inlet is controlled by a temperature controller located downstream of the Trim Cooler and downstream of the point where the by-pass rejoins the EC-1 Reactor liquid recycle stream.

8. A heat integration system according to claim 1, additionally comprising a two phase separator for separating two phase flow in said side draw from the EC-1 Reactor in a first compartment providing liquid recycle to the EC-1 Reactor and a second compartment providing a two phase flow to said second EC Reactor EC-2, such that the two phase flow to EC-2 Reactor is stable; wherein the separator operates without a liquid level in the second compartment to drive the two phase flow to said EC-2 Reactor, thereby avoiding the risk of a liquid level building up and flooding the separation vessel, and upsetting the removal of gas from the liquid recycle.

* * * * *